(12) United States Patent
Nagai et al.

(10) Patent No.: US 12,525,381 B2
(45) Date of Patent: Jan. 13, 2026

(54) MULTILAYER COIL COMPONENT

(71) Applicant: TDK CORPORATION, Tokyo (JP)

(72) Inventors: Yusuke Nagai, Tokyo (JP); Kazuhiro Ebina, Tokyo (JP); Kunihiko Kawasaki, Tokyo (JP); Shinichi Kondo, Tokyo (JP); Yuya Ishima, Tokyo (JP); Shinichi Sato, Tokyo (JP); Seiichi Nakagawa, Tokyo (JP); Kosuke Ito, Tokyo (JP); Keito Yasuda, Tokyo (JP); Youhei Iida, Tokyo (JP)

(73) Assignee: TDK CORPORATION, Tokyo (JP)

( * ) Notice: Subject to any disclaimer, the term of this patent is extended or adjusted under 35 U.S.C. 154(b) by 606 days.

(21) Appl. No.: 18/085,983

(22) Filed: Dec. 21, 2022

(65) Prior Publication Data

US 2023/0230742 A1    Jul. 20, 2023

(30) Foreign Application Priority Data

Jan. 19, 2022   (JP) .................................. 2022-006239

(51) Int. Cl.
  *H01F 17/00*   (2006.01)
  *H01F 1/36*   (2006.01)
  *H01F 27/02*   (2006.01)
  *H01F 27/29*   (2006.01)

(52) U.S. Cl.
  CPC .......... *H01F 17/0013* (2013.01); *H01F 1/36* (2013.01); *H01F 27/022* (2013.01); *H01F 27/292* (2013.01)

(58) Field of Classification Search
  CPC ...... H01F 17/0013; H01F 1/36; H01F 27/022; H01F 27/292
  See application file for complete search history.

(56) References Cited

U.S. PATENT DOCUMENTS

| | | | | |
|---|---|---|---|---|
| 2008/0073108 A1* | 3/2008 | Saito | .................... | H01G 4/2325 174/256 |
| 2008/0257488 A1* | 10/2008 | Yamano | ................ | H01F 41/122 156/274.2 |
| 2013/0038416 A1* | 2/2013 | Arai | ......................... | H01F 1/33 336/83 |
| 2015/0022940 A1* | 1/2015 | Han | ......................... | H01G 4/30 252/514 |
| 2016/0035476 A1* | 2/2016 | Mimura | ................ | H01F 27/327 336/199 |
| 2019/0348214 A1* | 11/2019 | Tobita | ..................... | H01F 27/29 |

FOREIGN PATENT DOCUMENTS

| | | |
|---|---|---|
| JP | 2013-38263 A | 2/2013 |
| JP | 2019-197783 A | 11/2019 |
| JP | 2021141306 A * | 9/2021 |

* cited by examiner

*Primary Examiner* — Malcolm Barnes
(74) *Attorney, Agent, or Firm* — Oliff PLC

(57) ABSTRACT

A multilayer coil component includes an element body including an end surface, a coil disposed in the element body, and an external electrode disposed on an end portion of the element body and connected to the coil. The external electrode includes a conductive resin layer. The conductive resin layer includes resin and a plurality of metal particles and is in contact with the end surface. The conductive resin layer includes a metal particle group. The metal particle group consists a plurality of first metal particles included in the plurality of metal particles, and the plurality of first metal particles is adjacent to the end surface and separated from the end surface.

11 Claims, 10 Drawing Sheets

MULTILAYER COIL COMPONENT

BACKGROUND OF THE INVENTION

1. Field of the Invention

The present disclosure relates to a multilayer coil component.

2. Description of Related Art

Known multilayer coil components include an element body including a pair of end surfaces opposing each other, a coil disposed in the element body, and a pair of external electrodes disposed on both end portions of the element body (for example, Japanese Unexamined Patent Publication No. 2013-38263). The element body includes metal magnetic particles. Each of the pair of external electrodes includes a sintered metal layer in contact with a corresponding end surface of the pair of end surfaces.

SUMMARY OF THE INVENTION

A configuration in which the sintered metal layer is in contact with the end surface of the element body tends to reduce an interval between the coil and the sintered metal layer. A configuration in which the interval between the coil and the sintered metal layer is small tends to increase stray capacitance between the coil and the sintered metal layer. An increase in stray capacitance results in a decrease in self-resonant frequency of the multilayer coil component. The decrease in the self-resonant frequency may deteriorate characteristics of the multilayer coil component.

One aspect of the present disclosure provides a multilayer coil component that restrains a decrease in self-resonant frequency.

A multilayer coil component according to one aspect of the present disclosure includes an element body, a coil disposed in the element body, and a pair of external electrodes connected to the coil. The element body includes a plurality of metal magnetic particles and includes a pair of end surfaces opposing each other. The pair of external electrodes are respectively disposed on both end portions of the element body in a direction in which the pair of end surfaces oppose each other. Each of the pair of external electrodes includes a conductive resin layer including resin and a plurality of metal particles and in contact with a corresponding end surface of the pair of end surfaces. The conductive resin layer includes a metal particle group. The metal particle group consists of a plurality of first metal particles included in the plurality of metal particles, the plurality of first metal particles adjacent to the corresponding end surface and separated from the corresponding end surface.

In the one aspect described above, the conductive resin layer includes the metal particle group described above. The one aspect described above includes a configuration in which the plurality of first metal particles are separated from the corresponding end surface. This configuration increases the distance between the plurality of first metal particles and the coil. Therefore, the one aspect described above reduces stray capacitance between the conductive resin layer and the coil. As a result, the one aspect described above restrains a decrease in self-resonant frequency.

In the one aspect described above, the conductive resin layer may include another metal particle group. In this case, the other metal particle group consists of a plurality of second metal particles included in the plurality of metal particles, the plurality of second metal particles adjacent to the corresponding end surface and in contact with the corresponding end surface. A position of an end of each of the plurality of first metal particles closest to the end surface and a position of an end of each of the plurality of second metal particles closest to the end surface may be different in the direction in which the pair of end surfaces oppose each other.

In a configuration in which the position of the end of the first metal particle and the position of the end of the second metal particle are different in the direction in which the pair of end surfaces oppose each other, resin tends to be present between the metal particle group and the end surface. Therefore, this configuration improves fixing strength between the conductive resin layer and the element body.

Since the second metal particle is in contact with the end surface, the second metal particle tends to be in physical contact with the coil. Therefore, this configuration reliably maintains electrical connection between the conductive resin layer and the coil.

In the one aspect described above, the plurality of metal particles may have an average particle diameter larger than 50% of an average particle diameter of the plurality of metal magnetic particles.

In a configuration in which the average particle diameter of the plurality of metal particles is larger than 50% of the average particle diameter of the plurality of metal magnetic particles, the metal particles tend not to enter between the metal magnetic particles even in a case where the metal particles are exposed on a surface that is included in the conductive resin layer and is in contact with the element body. Therefore, this configuration tends not to reduce the distance between the metal particle contained in the conductive resin layer and the coil. As a result, this configuration restrains an increase in the stray capacitance between the conductive resin layer and the coil.

In the one aspect described above, the coil may include a plurality of coil conductors electrically connected to each other. The plurality of coil conductors may include a pair of coil conductors each including a connection end exposed on the corresponding end surface. Each of the pair of end surfaces may include a first region and a second region. In this case, the connection end is exposed in the first region, and the second region opposes a coil conductor, among the plurality of coil conductors, excluding the coil conductor including the connection end exposed in the first region in the direction in which the pair of end surfaces oppose each other. The conductive resin layer may include a first electrode portion in contact with the first region and a second electrode portion in contact with the second region. The first electrode portion may have a content ratio of the metal particle larger than a content ratio of the metal particle in the second electrode portion.

In a configuration in which the conductive resin layer includes the first and second electrode portions described above, the connection end of the coil conductor is connected to the first electrode portion. In a configuration in which the content ratio of the metal particle included in the first electrode portion is larger than the content ratio of the metal particle included in the second electrode portion, the connection end tends to be physically connected to the metal particles included in the first electrode portion. Therefore, this configuration improves connectivity between the coil conductor including the connection end and the conductive resin layer.

In a configuration in which the second electrode portion opposes the coil conductor, among the plurality of coil conductors, excluding the coil conductor including the connection end exposed in the first region in the direction in which the pair of end surfaces oppose each other, stray capacitance tends to be generated between the second electrode portion and the coil conductor. However, in a configuration in which the second electrode portion has the content ratio of the metal particle smaller than the content ratio of the metal particle in the first electrode portion, stray capacitance between the second electrode portion and the coil conductor tends to be reduced. Therefore, this configuration restrains an increase in the stray capacitance between the conductive resin layer and the coil.

In the one aspect described above, the conductive resin layer may include a first electrode portion and a second electrode portion disposed on the first electrode portion. The first electrode portion may be in contact with the corresponding end surface and include the metal particle group. The first electrode portion may have a content ratio of the metal particle smaller than a content ratio of the metal particle in the second electrode portion.

In a configuration in which the first electrode portion has the content ratio of the metal particle smaller than the content ratio of the metal particle in the second electrode portion, stray capacitance between the first electrode portion and the coil conductor tends to be reduced. Therefore, this configuration restrains an increase in the stray capacitance between the conductive resin layer and the coil.

In the one aspect described above, each of the pair of end surfaces may be formed with a recess. The conductive resin layer may be in contact with a surface portion defining the recess, the surface portion included in the corresponding end surface.

A configuration in which the conductive resin layer is in contact with the surface portion increases a contact area between the conductive resin layer and the element body as compared with a configuration in which the pair of end surfaces are flat. Therefore, the configuration in which the conductive resin layer is in contact with the surface portion improves fixing strength between the external electrode and the element body.

In the one aspect described above, the coil may include a plurality of coil conductors electrically connected to each other. Each of the pair of end surfaces may be formed with a recess. The conductive resin layer may be in contact with a surface portion defining the recess, the surface portion included in the corresponding end surface. Each of the recesses may be formed at a position not overlapping the plurality of coil conductors when viewed in the direction in which the pair of end surfaces oppose each other and a position different from the plurality of coil conductors in a direction intersecting the direction in which the pair of end surfaces oppose each other.

A configuration in which the recess is formed at the position described above tends not to reduce a distance between the conductive resin layer and the coil conductor as compared with a configuration in which the recess is formed at, for example, the same position as the plurality of coil conductors in the direction intersecting the direction in which the pair of end surfaces oppose each other. Therefore, the configuration in which the recess is formed at the position described above improves fixing strength between the external electrode and the element body and restrains an increase in the stray capacitance between the conductive resin layer and the coil.

The present disclosure will become more fully understood from the detailed description given hereinafter and the accompanying drawings which are given by way of illustration only, and thus are not to be considered as limiting the present disclosure.

Further scope of applicability of the present disclosure will become apparent from the detailed description given hereinafter. However, it should be understood that the detailed description and specific examples, while indicating embodiments of the disclosure, are given by way of illustration only, since various changes and modifications within the spirit and scope of the disclosure will become apparent to those skilled in the art from this detailed description.

DETAILED DESCRIPTION OF EMBODIMENTS

Figure 1:
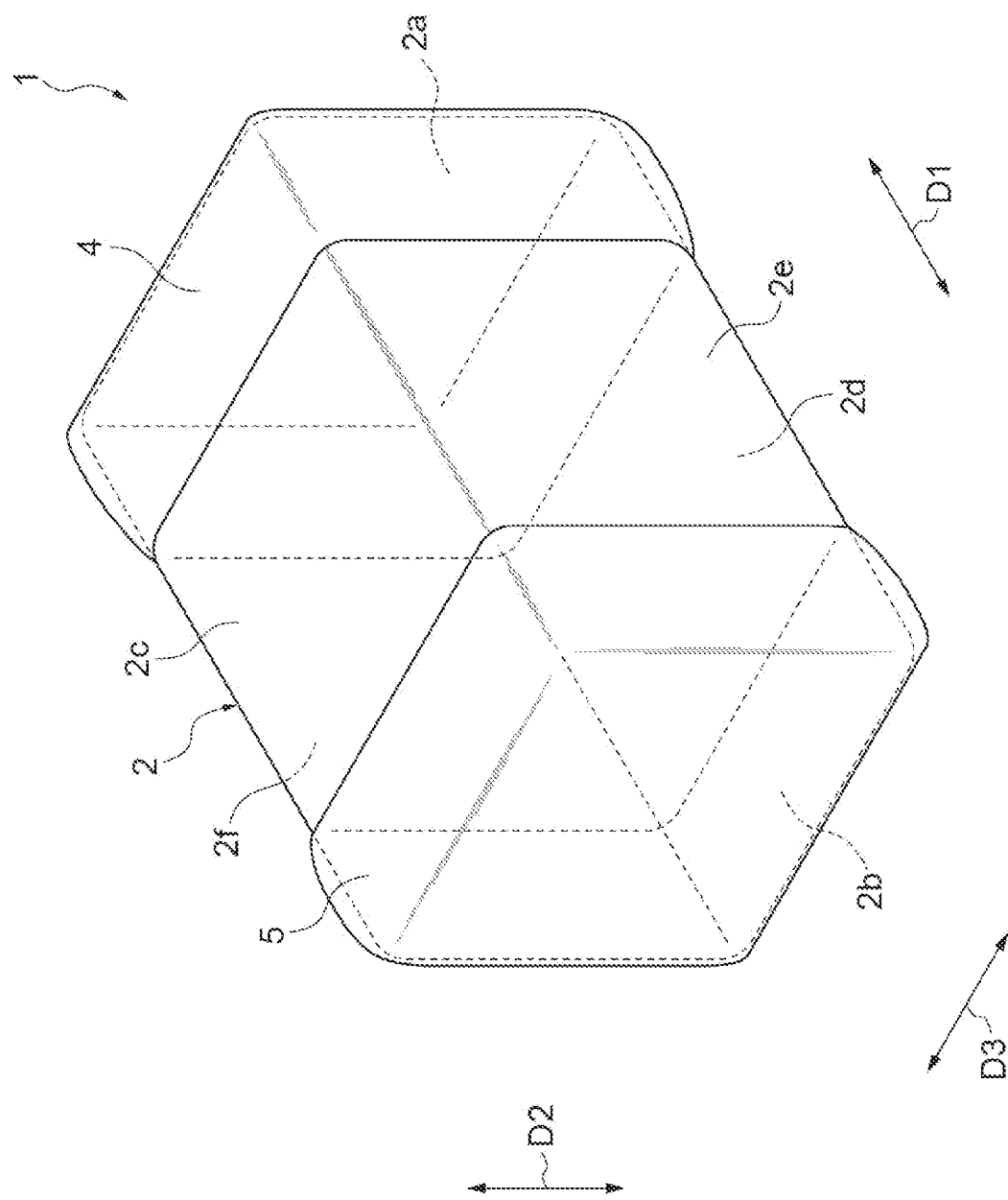
FIG. 1 is a perspective view illustrating a multilayer coil component according to an embodiment.

Hereinafter, embodiments of the present disclosure will be described in detail with reference to the accompanying drawings. In the following description, the same elements or elements having the same functions are denoted with the same reference numerals and overlapped explanation is omitted.

Figure 2:
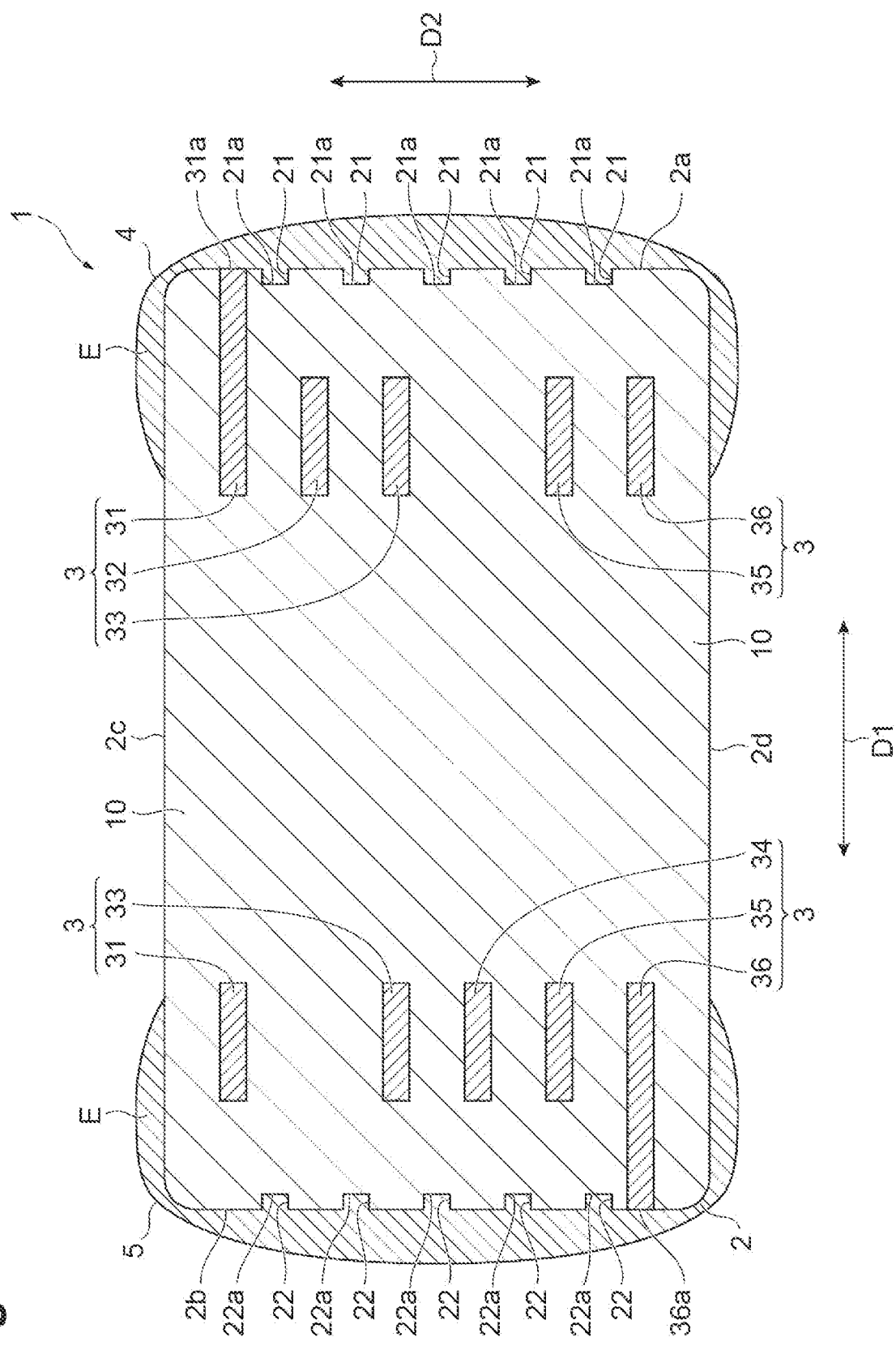
FIG. 2 is a diagram illustrating a cross-sectional configuration of the multilayer coil component according to the present embodiment.
Figure 3:
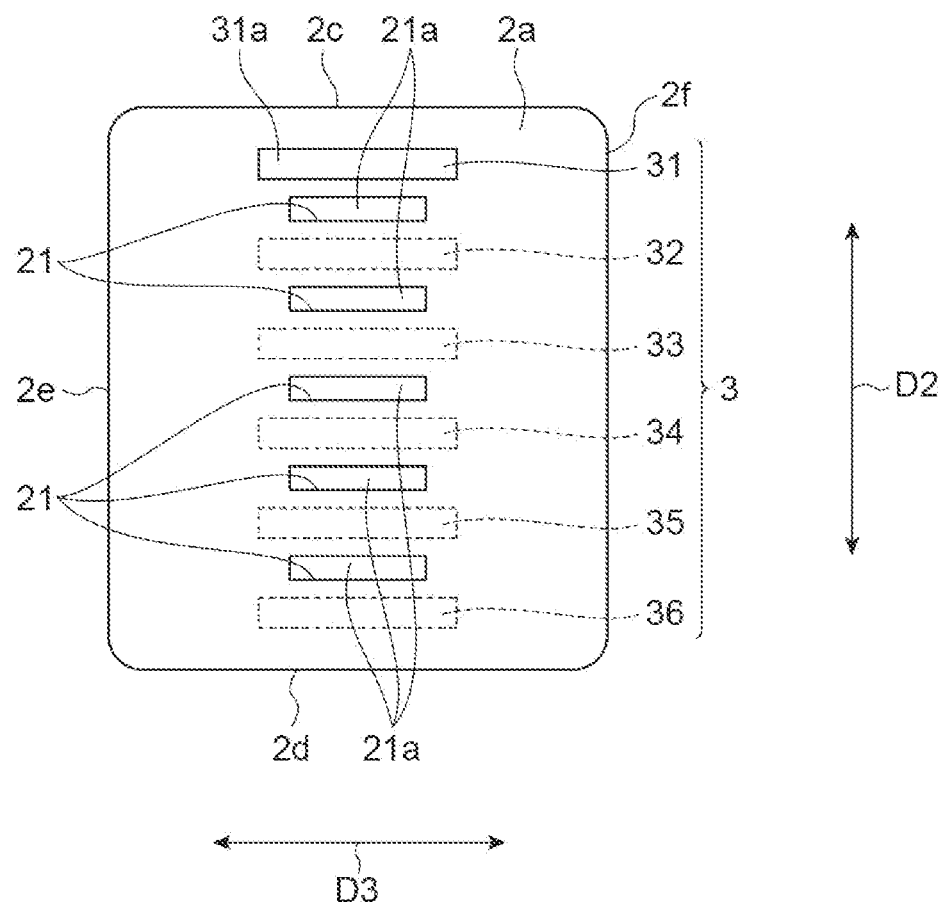
FIG. 3 is a diagram illustrating a plurality of coil conductors and recesses.
Figure 4:
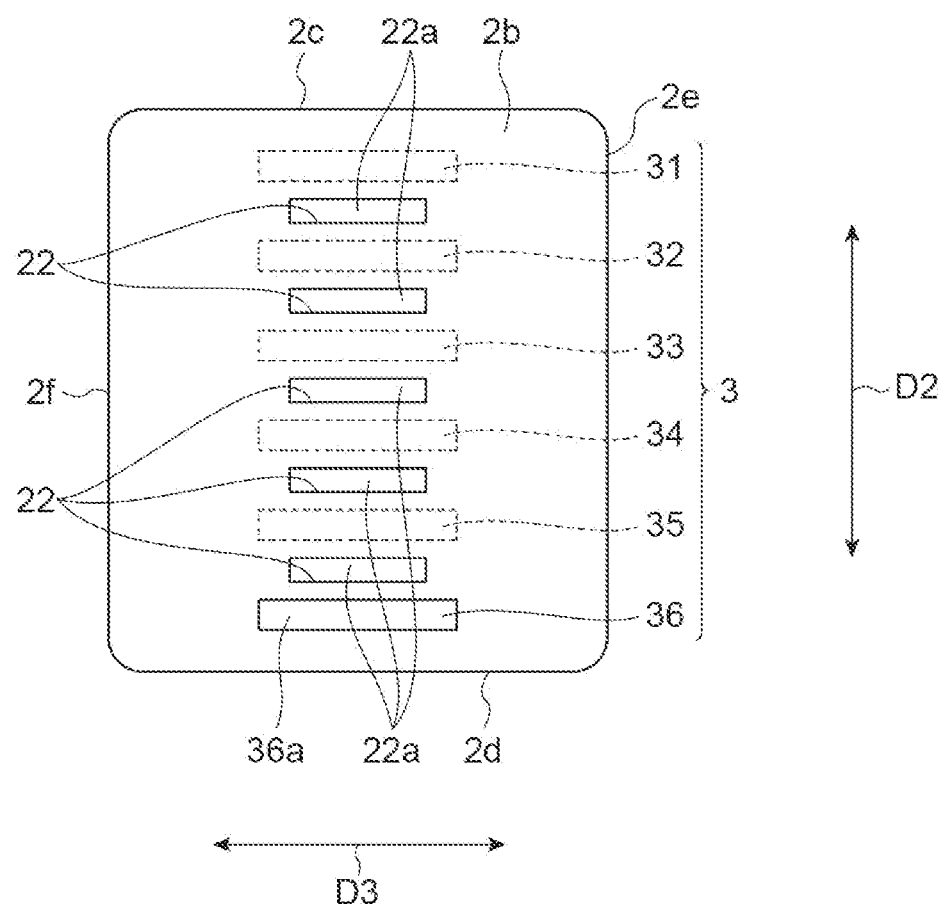
FIG. 4 is a diagram illustrating the plurality of coil conductors and recesses.
Figure 5:
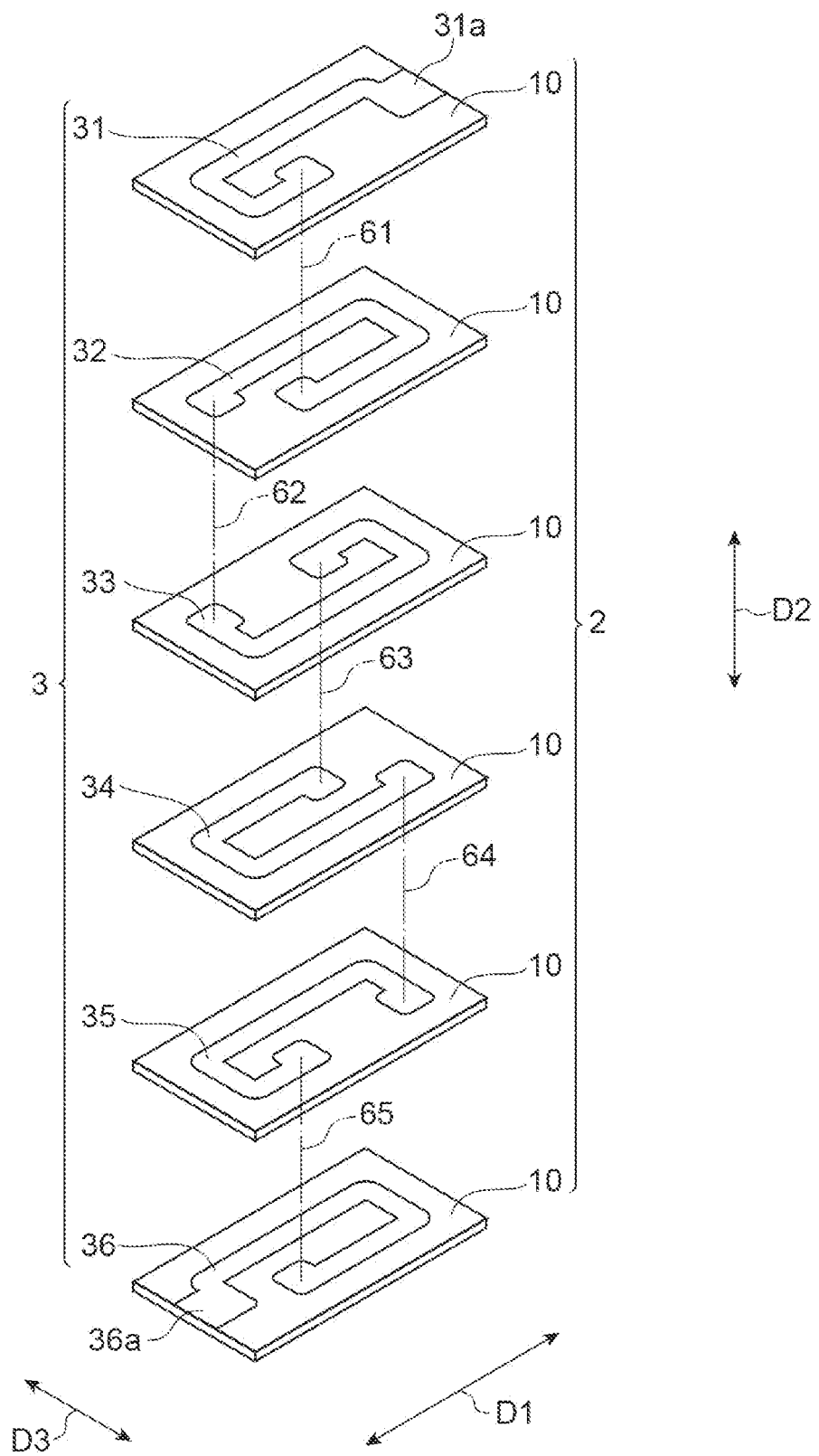
FIG. 5 is an exploded perspective view of an element body and a coil.
Figure 6:
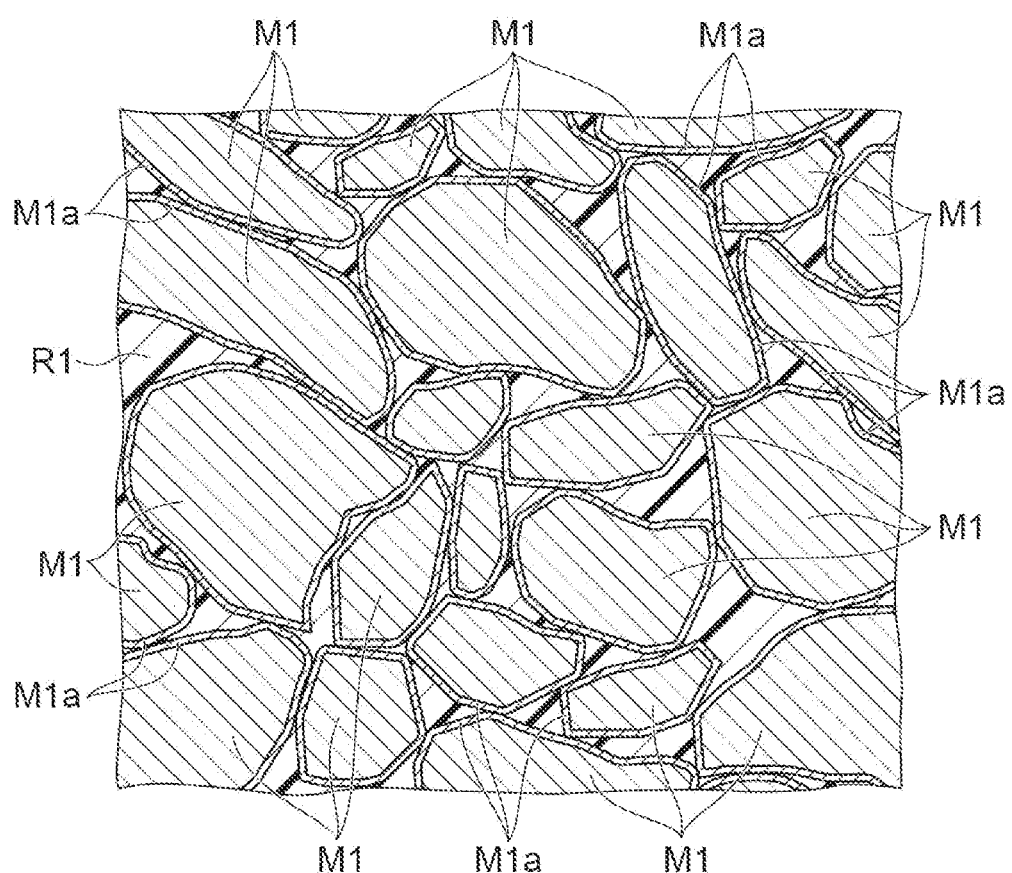
FIG. 6 is a diagram illustrating a configuration of the element body.
Figure 7:
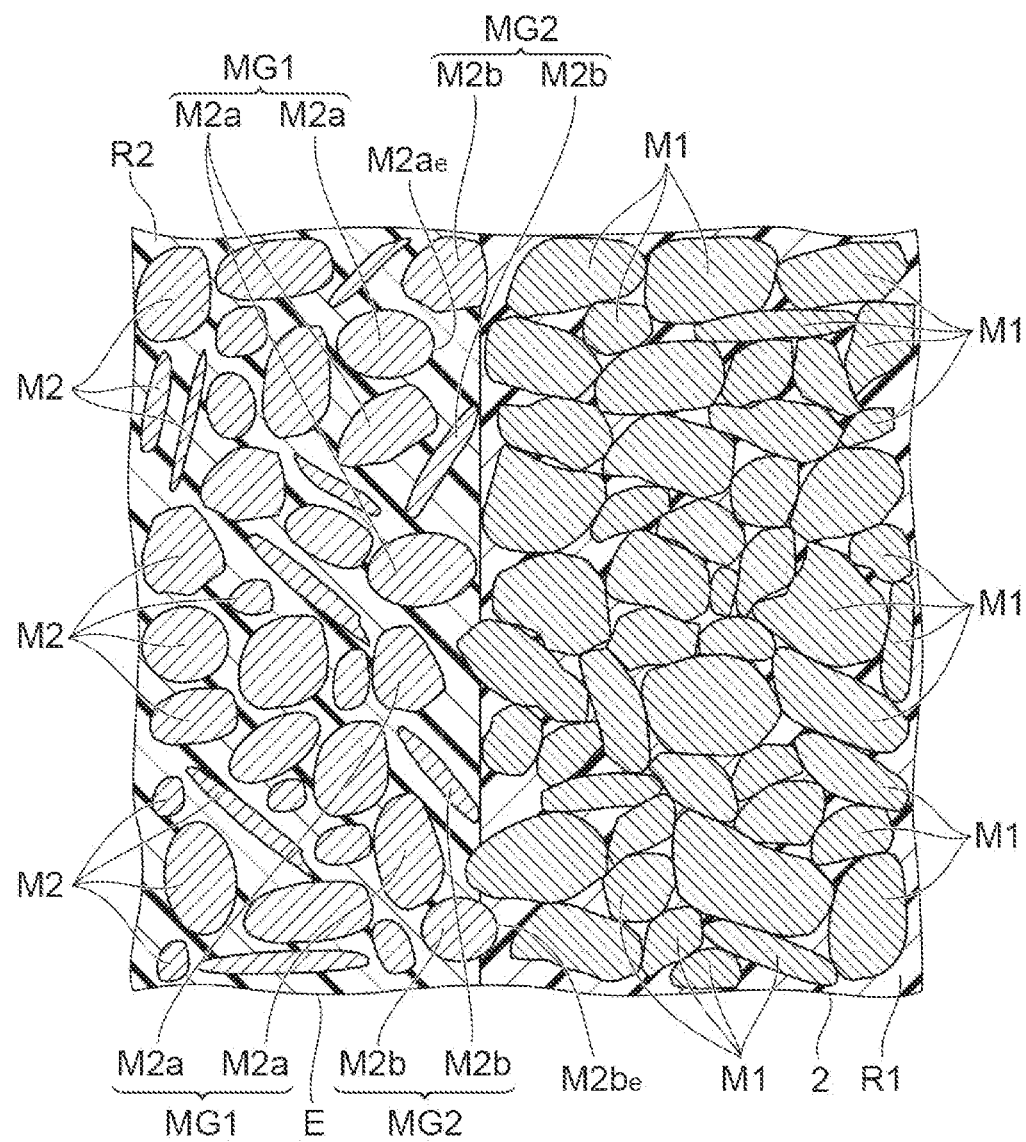
FIG. 7 is a diagram illustrating a configuration of the element body and a conductive resin layer.
Figure 8:
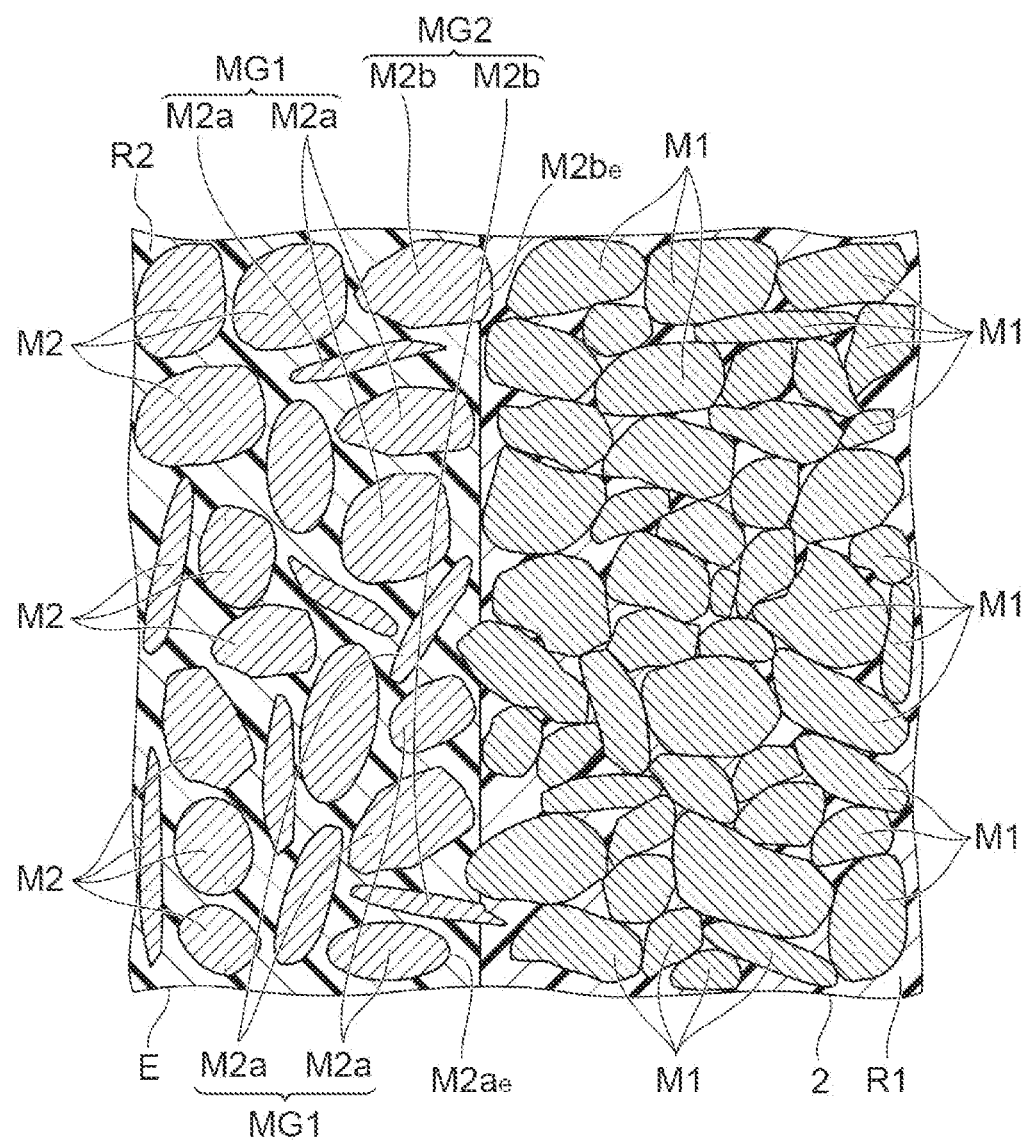
FIG. 8 is a diagram illustrating a configuration of the element body and the conductive resin layer.

A configuration of a multilayer coil component 1 according to the present embodiment will be described with reference to FIGS. 1 to 6. FIG. 1 is a perspective view illustrating the multilayer coil component according to the present embodiment. FIG. 2 is a diagram illustrating a cross-sectional configuration of the multilayer coil component according to the present embodiment. FIGS. 3 and 4 are diagrams illustrating a plurality of coil conductors and recesses. FIG. 5 is an exploded perspective view of an element body and a coil. FIG. 6 is a diagram illustrating the configuration of the element body. FIGS. 7 and 8 are diagrams illustrating the configurations of the element body and a conductive resin layer.

As illustrated in FIGS. 1 and 2, the multilayer coil component 1 includes an element body 2, a coil 3, and a pair of external electrodes 4 and 5. In the present embodiment, the coil 3 includes a plurality of coil conductors 31, 32, 33, 34, 35, and 36.

The element body 2 has a rectangular parallelepiped shape. The rectangular parallelepiped shape includes, for example, a rectangular parallelepiped shape with chamfered corners and ridge portions or a rectangular parallelepiped shape with rounded corners and ridge portions. The element body 2 includes a pair of end surfaces 2a and 2b opposing each other and four side surfaces 2c, 2d, 2e, and 2f. In the present embodiment, the pair of end surfaces 2a and 2b oppose each other in a first direction D1, the side surfaces 2c and 2d oppose each other in a second direction D2, and the side surfaces 2e and 2f oppose each other in a third direction D3. The pair of end surfaces 2a and 2b and the four side surfaces 2c, 2d, 2e, and 2f constitute an outer surface of the element body 2. Each of the four side surfaces 2c, 2d, 2e, and 2f is adjacent to the end surface 2a and the end surface 2b and extends in the first direction D1 to couple the end surface 2a and the end surface 2b. One of the four side surfaces 2c, 2d, 2e, and 2f may be arranged to constitute a mounting surface. When, for example, the multilayer coil component 1 is mounted on an electronic device, the mounting surface opposes the electronic device. The electronic device includes, for example, a circuit board or an electronic component.

As illustrated in FIG. 3, at least one recess 21 is formed in the end surface 2a. The recess 21 is defined by the end surface 2a. The recess 21 is defined by a surface portion 21a included in the end surface 2a. In the present embodiment, the number of the recesses 21 is "5". The number of the recesses 21 is not limited to the above number. Each surface portion 21a includes, for example, a plurality of surfaces. In the present embodiment, each surface portion 21a includes five surfaces. The shape of each recess 21a is not limited to the illustrated shape. The number of the recesses 21 may be more or less than the above number. The recess 21 is recessed in a direction included in the first direction D and directed from the end surface 2a to the end surface 2b. The first direction D1 is a depth direction of the recess 21. A depth of the recess 21 is, for example, equal to or more than 1 μm and equal to or less than 100 μm. In the present embodiment, the depth of the recess 21 is 20 μm. In a configuration in which a plurality of the recesses 21 are formed in the end surface 2a, the depths of the respective recesses 21 may be mutually equal or different. The depth of the recess 21 may be constant or may vary, in one recess 21. In the present embodiment, the recess 21 has a substantially rectangular shape when viewed in the first direction D1. The recess 21 may have a circular or polygonal shape when viewed in the first direction D1. In the present embodiment, the recess 21 is formed to extend in the third direction D3.

The recesses 21 are formed at positions not overlapping the plurality of coil conductors 31 to 36 when viewed in the first direction D1. The recesses 21 are formed at positions different from the plurality of coil conductors 31 to 36 in the second direction D2. In the present embodiment, the recesses 21 and the plurality of coil conductors 31 to 36 are alternately positioned in the second direction D2 when viewed from the first direction D1. The recesses 21 are formed to be positioned between the plurality of coil conductors 31 to 36 in the second direction D2. The recess 21 overlaps the coil conductor 31 when viewed in the second direction D2. The recess 21 does not overlap the plurality of coil conductors 32 to 36 other than the coil conductor 31 when viewed in the second direction D2. The depth of the recess 21 is smaller than a shortest distance between the plurality of coil conductors 32 to 36 and the end surface 2a. The recess 21 may be formed at a position between the coil conductor 31 and the side surface 2c or a position between the coil conductor 36 and the side surface 2d in the second direction D2.

As illustrated in FIG. 4, at least one recess 22 is formed in the end surface 2b. The recess 22 is defined by the end surface 2b. The recess 22 is defined by a surface portion 22a included in the end surface 2b. In the present embodiment, the number of the recesses 22 is "5". The number of the recesses 22 is not limited to the above number. Each surface portion 22a includes, for example, a plurality of surfaces. In the present embodiment, each surface portion 22a includes five surfaces. The shape of each recess 22a is not limited to the illustrated shape. The number of the recesses 22 may be more or less than the above number. The recess 22 is recessed in a direction included in the first direction D and directed from the end surface 2b to the end surface 2a. The first direction D1 is a depth direction of the recess 22. A depth of the recess 22 is, for example, equal to or more than 1 μm and equal to or less than 100 μm. In the present embodiment, the depth of the recess 22 is 20 μm. In a configuration in which a plurality of the recesses 22 are formed in the end surface 2b, the depths of the respective recesses 22 may be mutually equal or different. The depth of the recess 22 may be constant or may vary in one recess 22. In the present embodiment, the recess 22 has a substantially rectangular shape when viewed in the first direction D1. The recess 22 may have a circular or polygonal shape when viewed in the first direction D1. In the present embodiment, the recess 22 is formed to extend in the third direction D3.

The recesses 22 are formed at positions not overlapping the plurality of coil conductors 31 to 36 when viewed in the first direction D1. The recesses 22 are formed at positions different from the plurality of coil conductors 31 to 36 in the second direction D2. In the present embodiment, the recesses 22 and the plurality of coil conductors 31 to 36 are alternately positioned in the second direction D2 when viewed from the first direction D1. The recesses 22 are formed to be positioned between the plurality of coil conductors 31 to 36 in the second direction D2. The recess 22 overlaps the coil conductor 36 when viewed in the second direction D2. The recess 22 does not overlap the plurality of coil conductors 31 to 35 other than the coil conductor 36 when viewed in the second direction D2. The depth of the recess 22 is smaller than a shortest distance between the plurality of coil conductors 31 to 35 and the end surface 2b. The recess 22 may be formed at a position between the coil conductor 31 and the side surface 2c or a position between the coil conductor 36 and the side surface 2d in the second direction D2.

As illustrated in FIG. 5, the element body 2 is configured through laminating a plurality of magnetic body layers 10. Each magnetic body layer 10 is laminated in the second direction D2. The element body 2 includes the plurality of laminated magnetic body layers 10. Each magnetic body layer 10 has a rectangular shape. The rectangular shape includes a shape with a rounded corner or a shape with a chamfered corner. The respective magnetic body layers 10 are integrated with each other to such an extent that boundaries between the respective magnetic body layers 10 cannot be visually recognized.

Each magnetic body layer 10 includes a plurality of metal magnetic particles M1. The element body 2 includes the plurality of metal magnetic particles M1. The plurality of metal magnetic particles M1 include, for example, a soft magnetic alloy. The soft magnetic alloy includes, for example, a Fe—Si-based alloy. When the soft magnetic alloy includes the Fe—Si-based alloy, the soft magnetic alloy may include P. The soft magnetic alloy may include, for example, a Fe—Ni—Si—M-based alloy. "M" includes one or more elements selected from the group consisting of Co, Cr, Mn, P, Ti, Zr, Hf, Nb, Ta, Mo, Mg, Ca, Sr, Ba, Zn, B, Al, and rare-earth elements.

As illustrated in FIG. 6, an oxide film M1a is formed on the surface of each metal magnetic particle M1. The plurality of metal magnetic particles M1 that are adjacent to each other are bonded to each other through bonding the oxide films M1a formed on the surfaces of the plurality of adjacent metal magnetic particles M1 to each other. The plurality of adjacent metal magnetic particles M1 are bonded to each other with the oxide films M1a present between the plurality of adjacent metal magnetic particles M1.

The element body 2 includes a resin R1. The resin R1 is present between the plurality of metal magnetic particles M1. The resin R1 has electrical insulation. The resin R1 includes an electrically insulating resin. The electrically insulating resin includes, for example, silicone resin, phenolic resin, acrylic resin, or epoxy resin. The gaps between the plurality of adjacent metal magnetic particles M1 may be impregnated with the resin R1.

Each of the end surfaces 2a and 2b is constituted by the resin R1 and the metal magnetic particle M1 (oxide film M1a). The end surfaces 2a and 2b include a surface of the resin R1 and a surface of the metal magnetic particle M1 (oxide film M1a).

The first direction D1 is a length direction of the element body 2, the second direction D2 is a height direction of the element body 2, and the third direction D3 is a width direction of the element body 2. A length of the element body 2 is, for example, equal to or more than 0.2 mm and equal to or less than 3.2 mm. A height of the element body 2 is, for example, equal to or more than 0.1 mm and equal to or less than 1.6 mm. A width of the element body 2 is, for example, equal to or more than 0.1 mm and equal to or less than 2.5 mm. In the present embodiment, the length of the element body 2 is 1.6 mm, the height of the element body 2 is 0.8 mm, and the width of the element body 2 is 0.8 mm.

The multilayer coil component 1 includes the coil 3 disposed in the element body 2. As illustrated in FIG. 5, the coil 3 includes the plurality of coil conductors 31, 32, 33, 34, 35, and 36. The plurality of coil conductors 31 to 36 are electrically connected to each other. The plurality of coil conductors 31 to 36 are disposed in the second direction D2. The coil 3 is constituted by the plurality of coil conductors 31 to 36. In the present embodiment, the number of the plurality of coil conductors 31 to 36 is "6". The coil conductor 31, the coil conductor 32, the coil conductor 33, the coil conductor 34, the coil conductor 35, and the coil conductor 36 are disposed in this order in a direction included in the second direction D2 and directed from the side surface 2d to the side surface 2c.

The coil conductor 31 includes a connection end 31a exposed on the end surface 2a. The connection end 31a is exposed at a position closer to the side surface 2c than a middle region of the end surface 2a when viewed in a direction orthogonal to the end surface 2a. The coil conductor 31 is physically connected to the external electrode 4 at the connection end 31a. The coil conductor 31 is electrically connected to the external electrode 4 through the connection end 31a. The coil conductor 31 constitutes one end of the coil 3.

The coil conductor 36 includes a connection end 36a exposed on the end surface 2b. The connection end 36a is exposed at a position closer to the side surface 2d than a middle region of the end surface 2b when viewed in a direction orthogonal to the end surface 2b. The coil conductor 36 is physically connected to the external electrode 5 at the connection end 36a. The coil conductor 36 is electrically connected to the external electrode 5 through the connection end 36a. The coil conductor 36 constitutes the other end of the coil 3.

The plurality of coil conductors 31 to 36 include, for example, plated conductors. Each of the coil conductors 31 to 36 includes an electrically conductive material. This electrically conductive material includes, for example, Ag, Pd, Cu, Al, or Ni.

The coil 3 includes a plurality of through hole conductors 61 to 65. The plurality of coil conductors 31 to 36 have end portions interconnected by the plurality of through hole conductors 61 to 65. The plurality of coil conductors 31 to 36 are electrically connected to each other by the plurality of through hole conductors 61 to 65. The coil 3 is constituted by the plurality of coil conductors 31 to 36 electrically connected to each other.

Each of the through hole conductors 61 to 65 includes an electrically conductive material. The electrically conductive material includes, for example, Ag, Pd, Cu, Al, or Ni. Each of the through hole conductors 61 to 65 is configured as a sintered body of electrically conductive paste. The electrically conductive paste contains conductive metal powder. The conductive metal powder includes, for example, Ag powder, Pd powder, Cu powder, Al powder, or Ni powder. Each of the through hole conductors 61 to 65 may be a plated conductor.

As illustrated in FIGS. 1 and 2, the pair of external electrodes 4 and 5 are disposed on both end portions of the element body 2 in the first direction D1. The external electrodes 4 and 5 are disposed on the element body 2 to oppose each other in the first direction D1. The external electrodes 4 and 5 are separated from each other in the first direction D1.

The external electrode 4 is disposed on the end portion of the element body 2 near the end surface 2a. The external electrode 4 is disposed on the end surface 2a. The external electrode 4 is also disposed on a part of each of the four side surfaces 2c, 2d, 2e, and 2f. A part that is included in the side surface 2c and where the external electrode 4 is disposed is positioned near the end surface 2a. A part that is included in the side surface 2d and where the external electrode 4 is disposed is positioned near the end surface 2a. A part that is included in the side surface 2e and where the external electrode 4 is disposed is positioned near the end surface 2a. A part that is included in the side surface 2f and where the external electrode 4 is disposed is positioned near the end surface 2a. In the present embodiment, the external electrode 4 is disposed on the entire end surface 2a and a part of each of the four side surfaces 2c, 2d, 2e, and 2f near the end surface 2a.

A portion that is included in the external electrode 4 and positioned on the end surface 2a covers the entire connection end 31a exposed on the end surface 2a. The connection end 31a is directly connected to the external electrode 4. The connection end 31a physically and electrically couples the coil conductor 31 and the external electrode 4. Therefore, the coil 3 is electrically connected to the external electrode 4.

The external electrode 5 is disposed on the end portion of the element body 2 on the end surface 2b side. The external electrode 5 is disposed on the end surface 2b. The external electrode 5 is also disposed on a part of each of the four side surfaces 2c, 2d, 2e, and 2f. A part that is included in the side surface 2c and where the external electrode 5 is disposed is positioned near the end surface 2b. A part that is included in the side surface 2d and where the external electrode 5 is disposed is positioned near the end surface 2b. A part that is included in the side surface 2e and where the external electrode 5 is disposed is positioned near the end surface 2b. A part that is included in the side surface 2f and where the external electrode 5 is disposed is positioned near the end surface 2b. In the present embodiment, the external electrode 5 is disposed on the entire end surface 2b and a part of each of the four side surfaces 2c, 2d, 2e, and 2f near the end surface 2b.

A portion that is included in the external electrode 5 and positioned on the end surface 2b covers the entire connection end 36a exposed on the end surface 2b. The connection end 36a is directly connected to the external electrode 5. The connection end 36a physically and electrically couples the coil conductor 36 and the external electrode 5. Therefore, the coil 3 is electrically connected to the external electrode 5.

Each of the external electrodes 4 and 5 includes an electrode layer E as illustrated in FIG. 2. In the present embodiment, each of the external electrodes 4 and 5 includes only the electrode layer E. Each of the external electrodes 4 and 5 is single-layered. The number of layers of each of the external electrodes 4 and 5 may be larger than the above number. The external electrodes 4 and 5 may include another electrode layer on the electrode layer E. The other electrode layer may include a plating layer.

First, a configuration of the electrode layer E included in the external electrode 4 will be described.

The electrode layer E included in the external electrode 4 is disposed on the end surface 2a. The entire end surface 2a is covered with the electrode layer E. The electrode layer E is in contact with the entire end surface 2a. The electrode layer E is in contact with the surface portion 21a defining the recess 21. In the present embodiment, the electrode layer E is in contact with the entire surface portion 21a. The electrode layer E is disposed on the end surface 2a to be connected to the connection end 31a.

The electrode layer E is also disposed on a part of each of the four side surfaces 2c, 2d, 2e, and 2f. Apart that is included in the side surface 2c and where the electrode layer E is disposed is positioned near the end surface 2a. A part that is included in the side surface 2d and where the electrode layer E is disposed is positioned near the end surface 2a. A part that is included in the side surface 2e and where the electrode layer E is disposed is positioned near the end surface 2a. A part that is included in the side surface 2f and where the electrode layer E is disposed is positioned near the end surface 2a. In the present embodiment, the electrode layer E is disposed on the entire end surface 2a and a part of each of the four side surfaces 2c, 2d, 2e, and 2f near the end surface 2a.

Next, a configuration of the electrode layer E included in the external electrode 5 will be described.

The electrode layer E included in the external electrode 5 is disposed on the end surface 2b. The entire end surface 2b is covered with the electrode layer E. The electrode layer E is in contact with the entire end surface 2b. The electrode layer E is in contact with the surface portion 22a defining the recess 22. In the present embodiment, the electrode layer E is in contact with the entire surface portion 22a. The electrode layer E is disposed on the end surface 2b to be connected to the connection end 36a.

The electrode layer E is also disposed on a part of each of the four side surfaces 2c, 2d, 2e, and 2f. A part that is included in the side surface 2c and where the electrode layer E is disposed is positioned near the end surface 2b. A part that is included in the side surface 2d and where the electrode layer E is disposed is positioned near the end surface 2b. A part that is included in the side surface 2e and where the electrode layer E is disposed is positioned near the end surface 2b. A part that is included in the side surface 2f and where the electrode layer E is disposed is positioned near the end surface 2b. In the present embodiment, the electrode layer E is disposed on the entire end surface 2b and a part of each of the four side surfaces 2c, 2d, 2e, and 2f near the end surface 2b.

The electrode layer E is formed by curing electrically conductive resin paste applied onto the element body 2. The electrode layer E includes an electrically conductive resin layer directly covering the element body 2. The electrically conductive resin paste includes, for example, resin, metal particles, and an organic solvent. The resin includes, for example, a thermosetting resin. The thermosetting resin includes, for example, phenolic resin, acrylic resin, silicone resin, epoxy resin, or polyimide resin. The metal particles include, for example, silver particles or copper particles.

As illustrated in FIG. 7, the electrode layer E includes a plurality of metal particles M2 and an electrically insulating resin R2. The plurality of metal particles M2 form a plurality of electrically conductive paths in the electrode layer E. Some of the plurality of metal particles M2 are coupled to each other. A part of the plurality of metal particles M2 is exposed on a surface that is included in the electrode layer E and is in contact with the element body 2. Another part of the plurality of metal particles M2 is exposed on an outer surface of the electrode layer E. This outer surface is a surface other than the surface in contact with the element body 2. In a configuration in which each of the external electrodes 4 and 5 includes the other electrode layer described above, the metal particles M2 exposed on the outer surface of the electrode layer E are in direct contact with the other electrode layer.

The external electrode 4 includes the electrode layer E that includes the plurality of metal particles M2 and the resin R2 and is in contact with the end surface 2a. The external electrode 5 includes the electrode layer E that includes the plurality of metal particles M2 and the resin R2 and is in contact with the end surface 2b. In FIGS. 7 and 8, the boundary between the element body 2 and the electrode layer E includes, for example, either the end surface 2a or the end surface 2b. In FIGS. 7 and 8, the reference numerals "2a" and "2b" is omitted.

The plurality of metal particles M2 include a metal particle group MG1 and a metal particle group MG2. The metal particle group MG2 constitutes a metal particle group different from the metal particle group MG1. The metal particle group MG1 consists of a plurality of metal particles M2a included in the plurality of metal particles M2. In the electrode layer E of the external electrode 4, the plurality of metal particles M2a are adjacent to the end surface 2a and separated from the end surface 2a. In the electrode layer E of the external electrode 5, the plurality of metal particles M2a are adjacent to the end surface 2b and separated from the end surface 2b. The metal particle group MG2 consists of a plurality of metal particles M2b included in the plurality of metal particles M2. In the electrode layer E of the external electrode 4, the plurality of metal particles M2b are adjacent to and in contact with the end surface 2a. In the electrode layer E of the external electrode 5, the plurality of metal particles M2b are adjacent to and in contact with the end surface 2b. The particle shape of the plurality of metal particles M2 is not limited. The plurality of metal particles M2 are, for example, substantially spherical, substantially needle-shaped, or flake-shaped. For example, when the plurality of metal particles M2a constitutes the plurality of first metal particles, the plurality of metal particles M2b constitutes the plurality of second metal particles.

First, a configuration of the plurality of metal particles M2 contained in the electrode layer E of the external electrode 4 will be described.

As illustrated in FIG. 7, the plurality of metal particles M2a included in the electrode layer E are adjacent to the end surface 2a and separated from the end surface 2a. The plurality of metal particles M2b included in the electrode layer E are adjacent to and in contact with the end surface 2a. The resin R2 is present between the plurality of metal particles M2a included in the electrode layer E and the end surface 2a. In the electrode layer E, the plurality of metal particles M2a oppose the end surface 2a in the first direction D1 with the resin R2 interposed between the plurality of metal particles M2a and the end surface 2a. In the electrode layer E, the plurality of metal particles M2a indirectly oppose the end surface 2a in the first direction D1. The plurality of metal particles M2b included in the electrode layer E are positioned at least at a portion that is included in the electrode layer E and is in contact with the connection end 31a. The plurality of metal particles M2b included in the electrode layer E electrically connect the external electrode 4 and the coil 3.

Each metal particle M2a included in the electrode layer E includes an end $M2a_e$ positioned closest to the end surface 2a in the metal particle M2a. Each metal particle M2b included in the electrode layer E includes an end $M2b_e$ positioned closest to the end surface 2a in the metal particle M2b. A position of the end $M2a_e$ and a position of the end $M2b_e$ are different in the first direction D1. The end $M2a_e$ is further apart from the end surface 2a in the first direction D1 than the end $M2b_e$. The end $M2a_e$ is a position at which a distance from the end surface 2a in the first direction D1 is the shortest in one metal particle M2a. The end $M2b_e$ is a position at which a distance from the end surface 2a in the first direction D1 is the shortest in one metal particle M2b. The shortest distance between the end $M2a_e$ and the end surface 2a is larger than the shortest distance between the end $M2b_e$ and the end surface 2a. In the electrode layer E, the positions of the ends $M2a_e$ of the metal particles M2a in the first direction D1 may differ from each other. In the electrode layer E, the positions of the ends $M2b_e$ of the metal particles M2b in the first direction D1 may differ from each other.

Next, a configuration of the plurality of metal particles M2 included in the electrode layer E of the external electrode 5 will be described. The configuration of the plurality of metal particles M2 included in the electrode layer E of the external electrode 5 is the same as the configuration of the plurality of metal particles M2 included in the electrode layer E of the external electrode 4, and illustration thereof is omitted.

The plurality of metal particles M2a included in the electrode layer E are adjacent to the end surface 2b and separated from the end surface 2b. The plurality of metal particles M2b included in the electrode layer E are adjacent to and in contact with the end surface 2b. The resin R2 is present between the plurality of metal particles M2a included in the electrode layer E and the end surface 2b. In the electrode layer E, the plurality of metal particles M2a oppose the end surface 2b in the first direction D1 with the resin R2 interposed between the plurality of metal particles M2a and the end surface 2b. In the electrode layer E, the plurality of metal particles M2a indirectly oppose the end surface 2b in the first direction D1. The plurality of metal particles M2b included in the electrode layer E are positioned at least at a portion that is included in the electrode layer E and is in contact with the connection end 36a. The plurality of metal particles M2b included in the electrode layer E electrically connect the external electrode 5 and the coil 3.

Each metal particle M2a included in the electrode layer E includes the end $M2a_e$ positioned closest to the end surface 2b in the metal particle M2a. Each metal particle M2b included in the electrode layer E includes the end $M2b_e$ positioned closest to the end surface 2b in the metal particle M2b. A position of the end $M2a_e$ and a position of the end $M2b_e$ are different in the first direction D1. The end $M2a_e$ is further apart from the end surface 2b in the first direction D1 than the end $M2b_e$. The end $M2a_e$ is a position at which a distance from the end surface 2b in the first direction D1 is the shortest in one metal particle M2a. The end $M2b_e$ is a position at which a distance from the end surface 2b in the first direction D1 is the shortest in one metal particle M2b. The shortest distance between the end $M2a_e$ and the end surface 2b is larger than the shortest distance between the end $M2b_e$ and the end surface 2b. In the electrode layer E, the positions of the ends $M2a_e$ of the metal particles M2a in the first direction D1 may differ from each other. In the electrode layer E, the positions of the ends $M2b_e$ of the metal particles M2b in the first direction D1 may differ from each other.

As illustrated in FIG. 8, an average particle diameter of the plurality of metal particles M2 may be larger than 50% of an average particle diameter of the plurality of metal magnetic particles M1. An average particle diameter of the metal particles M2b may be larger than 50% of the average particle diameter of the metal magnetic particles M1. An average particle diameter of the metal particles M2a may be larger than 50% of the average particle diameter of the metal magnetic particles M1. The average particle diameter of the metal particles M2b and the average particle diameter of the metal particles M2a may be equal or different.

The average particle diameter of the plurality of metal magnetic particles M1 is, for example, equal to or more than 1.0 μm and equal to or less than 50 μm. In the present embodiment, the average particle diameter of the plurality of metal magnetic particles M1 is 5.0 μm.

The average particle diameter of the plurality of metal particles M2 is, for example, equal to or more than 0.5 μm and equal to or less than 25 μm. In the present embodiment, the average particle diameter of the plurality of metal particles M2 is 4.0 μm.

The average particle diameters of the metal magnetic particles M1 and the metal particles M2 are obtained, for example, as follows.

A cross-sectional photograph of the multilayer coil component 1 including the element body 2 and the external electrodes 4 and 5 is acquired. The cross-sectional photograph is obtained from, for example, capturing a cross section of the multilayer coil component 1 when cut along a plane that is parallel to the pair of side surfaces 2e and 2f and is separated by a predetermined distance from the pair of side surfaces 2e and 2f. The plane is, for example, equidistant from the pair of side surfaces 2e and 2f.

Image processing is performed on the acquired cross-sectional photograph using software. From the image processing, a boundary between each metal particle M2 and each metal magnetic particle M1 is determined, and areas of each metal particle M2 and each metal magnetic particle M1 are obtained. Based on the obtained area of each metal magnetic particle M1, the particle diameter converted into an equivalent circle diameter is calculated for each metal magnetic particle M1. Based on the obtained area of each metal particle M2, the particle diameter converted into an equivalent circle diameter is calculated for each metal particle M2.

The particle diameters of 100 or more metal magnetic particles M1 are calculated, and a particle size distribution of these metal magnetic particles M1 is obtained. A particle diameter (d50) at an integrated value of 50% in the obtained particle size distribution is defined as the "average particle diameter" of the metal magnetic particles M1. The particle shape of the metal magnetic particles M1 is not particularly limited.

The particle diameters of 100 or more metal particles M2 are calculated, and a particle size distribution of these metal particles M2 is obtained. A particle diameter (d50) at an integrated value of 50% in the obtained particle size distribution is defined as the "average particle diameter" of the metal particles M2. The particle shape of the metal particles M2 is not particularly limited.

As described above, in the multilayer coil component 1, the electrode layer E includes the metal particle group MG1. The multilayer coil component 1 includes a configuration in which the plurality of metal particles M2a included in the metal particle group MG1 of the electrode layer E of the external electrode 4 are separated from the end surface 2a and the plurality of metal particles M2a included in the metal particle group MG1 of the electrode layer E of the external electrode 5 are separated from the end surface 2b. This configuration increases the distance between the metal particle M2a and the coil 3. Therefore, the multilayer coil component 1 reduces stray capacitance between the electrode layer E and the coil 3. As a result, the multilayer coil component 1 restrains a decrease in self-resonant frequency.

In the multilayer coil component 1, the electrode layer E includes the metal particle group MG2. The position of the end $M2a_e$ and the position of the end $M2b_e$ are different in the first direction D1.

Therefore, in the multilayer coil component 1, the resin R2 tends to be present between the metal particle group MG1 of the electrode layer E of the external electrode 4 and the end surface 2a, and between the metal particle group MG1 of the electrode layer E of the external electrode 5 and the end surface 2b. The multilayer coil component 1 improves fixing strength between the electrode layer E and the element body 2.

Since the metal particle M2b included in the metal particle group MG2 of the electrode layer E of the external electrode 4 is in contact with the end surface 2a and the metal particle M2b included in the metal particle group MG2 of the electrode layer E of the external electrode 5 is in contact with the end surface 2b, the metal particle M2b tends to be in physical contact with the coil 3. That is, the metal particle M2b of the external electrode 4 tends to be in physical contact with the coil conductors 31, and the metal particle M2b of the external electrode 5 tends to be in physical contact with the coil conductors 36. Therefore, the multilayer coil component 1 reliably maintains electrical connection between the electrode layers E and the coil 3.

In the multilayer coil component 1, the average particle diameter of the plurality of metal particles M2 may be larger than 50% of the average particle diameter of the plurality of metal magnetic particles M1.

In the configuration in which the average particle diameter of the metal particles M2 is larger than 50% of the average particle diameter of the metal magnetic particles M1, the metal particles M2 tend not to enter between the metal magnetic particles M1 even in a case where the metal particles M2 are exposed on the surface that is included in the electrode layer E and is in contact with the element body 2. Therefore, this configuration tends not to reduce a distance between the metal particle M2 and the coil 3. As a result, this configuration restrains an increase in the stray capacitance between the electrode layer E and the coil 3.

In the multilayer coil component 1, the end surface 2a is formed with the recess 21 and the end surface 2b is formed with the recess 22. The electrode layer E of the external electrode 4 is in contact with the surface portion 21a, and the electrode layer E of the external electrode 5 is in contact with the surface portion 22a.

The multilayer coil component 1 increases a contact area between the electrode layer E and the element body 2 as compared with a configuration in which the pair of end surfaces 2a and 2b are flat. Therefore, the multilayer coil component 1 improves fixing strength between the external electrodes 4 and 5 and the element body 2.

In the multilayer coil component 1, the recesses 21 and 22 are formed at positions not overlapping the plurality of coil conductors 31 to 36 when viewed in the first direction D1 and at positions different from the plurality of coil conductors 31 to 36 in the second direction D2.

The multilayer coil component 1 tends not to reduce a distance between the electrode layer E and the coil conductors 31 to 36 as compared with a configuration in which the recesses 21 and 22 are formed at, for example, the same positions as the coil conductors 31 to 36 in the second direction D2. Therefore, the multilayer coil component 1 improves fixing strength between the external electrodes 4 and 5 and the element body 2 and restrains an increase in the stray capacitance between the electrode layer E and the coil 3.

Figure 9:
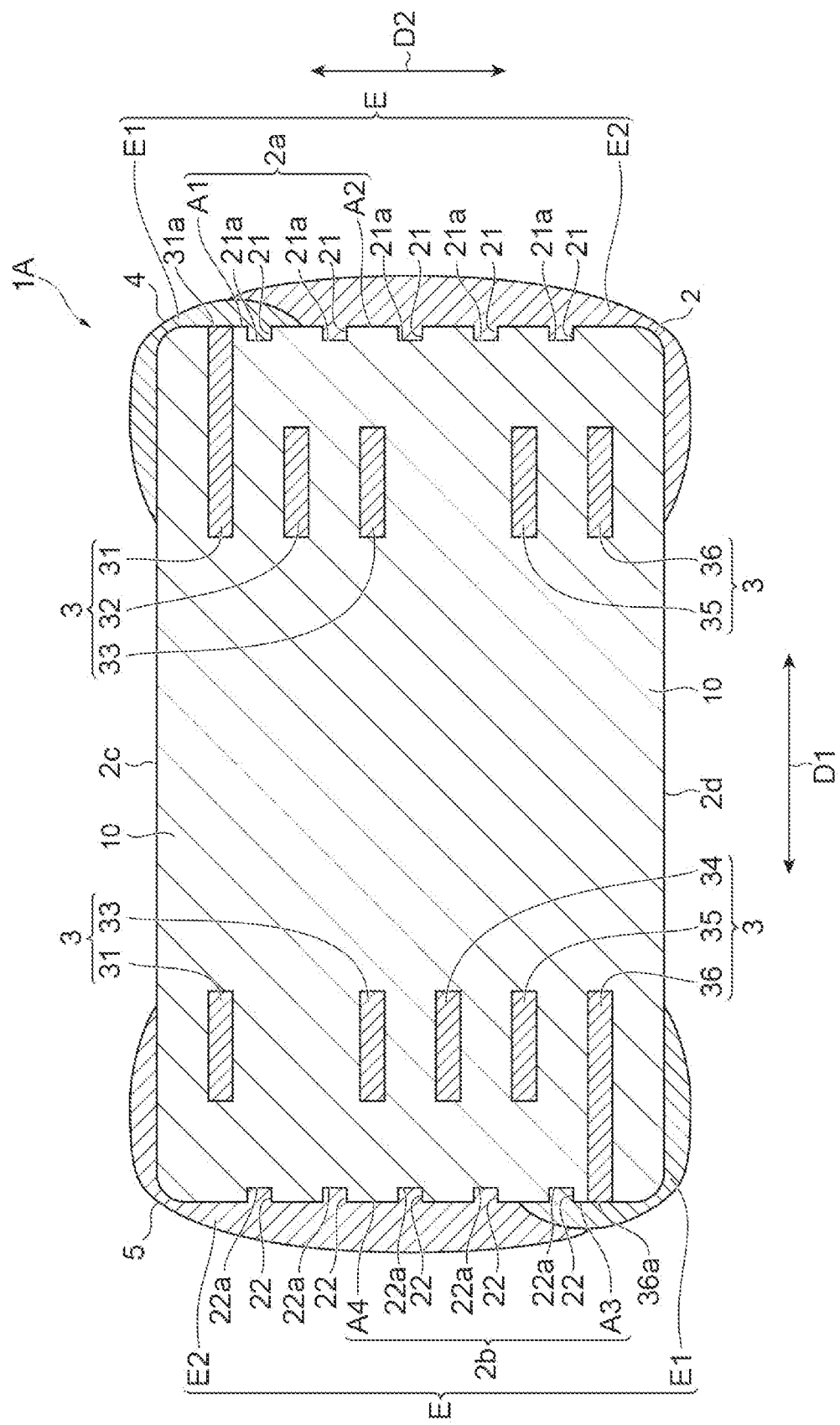
FIG. 9 is a diagram illustrating a cross-sectional configuration of a multilayer coil component according to a first modification of the present embodiment.

Next, a configuration of a multilayer coil component 1A according to a first modification of the present embodiment will be described with reference to FIG. 9. FIG. 9 is a diagram illustrating a cross-sectional configuration of the multilayer coil component according to the first modification. The multilayer coil component 1A is generally similar or identical to the multilayer coil component 1 described above. However, the multilayer coil component 1A differs from the multilayer coil component 1 in the configuration of the electrode layer E. The difference between the multilayer coil component 1A and the multilayer coil component 1 will be mainly described below.

The end surface 2a includes a region A1 and a region A2. The connection end 31a is exposed in the region A1. The region A2 opposes the coil conductors 32 to 36 other than the coil conductor 31 among the plurality of coil conductors 31 to 36 in the first direction D1. The coil conductor 31 includes the connection end 31a exposed in the region A1. The region A1 is positioned near the side surface 2c in the second direction D2. The region A1 is a partial region of the end surface 2a near the side surface 2c. For example, when the region A1 constitutes a first region, the region A2 constitutes a second region.

The end surface 2b includes a region A3 and a region A4. The connection end 36a is exposed in the region A3. The region A4 opposes the coil conductors 31 to 35 other than the coil conductor 36 among the plurality of coil conductors 31 to 36 in the first direction D1. The coil conductor 36 includes the connection end 36a exposed on the end surface 2b. The region A3 is positioned near the side surface 2d in the second direction D2. The region A3 is a partial region of the end surface 2*b* near the side surface 2*d*. For example, when the region A3 constitutes a first region, the region A4 constitutes a second region First, a configuration of the external electrode 4 included in the multilayer coil component 1A will be described.

The electrode layer E included in the external electrode 4 includes an electrode portion E1 in contact with the region A1 and an electrode portion E2 in contact with the region A2. In this modification, the electrode layer E includes only two electrode portions E1 and E2. The electrode portion E1 is in direct contact with the region A1, and the electrode portion E2 is in direct contact with the region A2. The electrode portion E1 is disposed on a part of the end surface 2*a*. The electrode portion E1 may be in contact with at least one surface portion 21*a*. In this modification, the electrode portion E1 is in contact with the surface portion 21*a* defining the recess 21 positioned between the coil conductors 31 and 32 in the second direction D2.

The electrode portion E1 is disposed on, for example, a part of each of the three side surfaces 2*c*, 2*e*, and 2*f*. A part that is included in the side surface 2*c* and where the electrode portion E1 is disposed is positioned near the end surface 2*a*. A part that is included in the side surface 2*e* and where the electrode portion E1 is disposed is positioned near the end surface 2*a* and near the side surface 2*c*. A part that is included in the side surface 2*f* and where the electrode portion E1 is disposed is positioned near the end surface 2*a* and near the side surface 2*c*. The electrode portion E1 may be disposed only in the region A1.

The electrode portion E2 is disposed on the electrode portion E1. The electrode portion E2 is disposed on a region included in the end surface 2*a* and exposed from the electrode portion E1. The region included in the end surface 2*a* and exposed from the electrode portion E1 includes the region A2. The electrode portion E2 is disposed to cover a part of the electrode portion E1 and a part of the end surface 2*a*. The electrode portion E2 is in direct contact with the electrode portion E1 and the end surface 2*a*. The electrode portion E2 is in contact with at least one surface portion 21*a*. In this modification, the electrode portion E2 is in contact with a plurality of the surface portions 21*a* excluding the surface portion 21*a* with which the electrode portion E1 is in contact.

The electrode portion E2 is disposed on a part of the side surface 2*d*. A part that is included in the side surface 2*d* and where the electrode portion E2 is disposed is positioned near the end surface 2*a*. The electrode portion E2 is disposed on a part of the side surface 2*e* and a part of the electrode portion E1 disposed on the side surface 2*e*. The electrode portion E2 is disposed to cover a part of the side surface 2*e* and a part of the electrode portion E1 disposed on the side surface 2*e*. The electrode portion E2 is in direct contact with the side surface 2*e* and the electrode portion E1 disposed on the side surface 2*e*. A part that is included in the side surface 2*e* and where the electrode portion E2 is disposed is positioned near the end surface 2*a*. A part that is included in the side surface 2*e* and covered with the electrode portion E2 is positioned near the side surface 2*d*. The electrode portion E2 is disposed on a part of the side surface 2*f* and a part of the electrode portion E1 disposed on the side surface 2*f*. The electrode portion E2 is disposed to cover a part of the side surface 2*f* and a part of the electrode portion E1 disposed on the side surface 2*f*. The electrode portion E2 is in direct contact with the side surface 2*f* and the electrode portion E1 disposed on the side surface 2*f*. A part that is included in the side surface 2*f* and where the electrode portion E2 is disposed is positioned near the end surface 2*a*. A part that is included in the side surface 2*f* and covered with the electrode portion E2 is positioned near the side surface 2*d*. A part that is included in the electrode portion E1 and covered with the electrode portion E2 is closer to the side surface 2*c* than to the side surface 2*d* in the second direction D2.

Next, a configuration of the external electrode 5 included in the multilayer coil component 1A will be described.

The electrode layer E included in the external electrode 5 includes the electrode portion E1 in contact with the region A3 and the electrode portion E2 in contact with the region A4. In this modification, the electrode layer E includes only two electrode portions E1 and E2. The electrode portion E1 is in direct contact with the region A3, and the electrode portion E2 is in direct contact with the region A4. The electrode portion E1 is disposed on a part of the end surface 2*b*. The electrode portion E1 may be in contact with at least one surface portion 22*a*. In this modification, the electrode portion E1 is in contact with the surface portion 22*a* defining the recess 22 positioned between the coil conductors 35 and 36 in the second direction D2.

The electrode portion E1 is disposed on, for example, a part of each of the three side surfaces 2*d*, 2*e*, and 2*f*. A part that is included in the side surface 2*d* and where the electrode portion E1 is disposed is positioned near the end surface 2*b*. A part that is included in the side surface 2*e* and where the electrode portion E1 is disposed is positioned near the end surface 2*b* and near the side surface 2*d*. A part that is included in the side surface 2*f* and where the electrode portion E1 is disposed is positioned near the end surface 2*b* and near the side surface 2*d*. The electrode portion E1 may be disposed only in the region A3.

The electrode portion E2 is disposed on the electrode portion E1. The electrode portion E2 is disposed on a region included in the end surface 2*b* and exposed from the electrode portion E1. The region included in the end surface 2*b* and exposed from the electrode portion E1 includes the region A4. The electrode portion E2 is disposed to cover a part of the electrode portion E1 and a part of the end surface 2*b*. The electrode portion E2 is in direct contact with the electrode portion E1 and the end surface 2*b*. The electrode portion E2 is in contact with at least one surface portion 22*a*. In this modification, the electrode portion E2 is in contact with a plurality of the surface portions 22*a* excluding the surface portion 22*a* with which the electrode portion E1 is in contact.

The electrode portion E2 is disposed on a part of the side surface 2*c*. A part that is included in the side surface 2*c* and where the electrode portion E2 is disposed is positioned near the end surface 2*b*. The electrode portion E2 is disposed on a part of the side surface 2*e* and a part of the electrode portion E1 disposed on the side surface 2*e*. The electrode portion E2 is disposed to cover a part of the side surface 2*e* and a part of the electrode portion E1 disposed on the side surface 2*e*. The electrode portion E2 is in direct contact with the side surface 2*e* and the electrode portion E1 disposed on the side surface 2*e*. A part that is included in the side surface 2*e* and where the electrode portion E2 is disposed is positioned near the end surface 2*b*. A part that is included in the side surface 2*e* and covered with the electrode portion E2 is positioned near the side surface 2*c*. The electrode portion E2 is disposed on a part of the side surface 2*f* and a part of the electrode portion E1 disposed on the side surface 2*f*. The electrode portion E2 is disposed to cover a part of the side surface 2*f* and a part of the electrode portion E1 disposed on the side surface 2*f*. The electrode portion E2 is in direct contact with the side surface 2*f* and the electrode portion E1 disposed on the side surface 2*f*. A part that is included in the side surface 2f and where the electrode portion E2 is disposed is positioned near the end surface 2b. A part that is included in the side surface 2f and covered with the electrode portion E2 is positioned near the side surface 2c. A part that is included in the electrode portion E1 and covered with the electrode portion E2 is closer to the side surface 2d than to the side surface 2c in the second direction D2.

As described above, each electrode layer E includes the electrode portion E1 and the electrode portion E2.

A content ratio of the plurality of metal particles M2 contained in the electrode portion E1 is larger than a content ratio of the plurality of metal particles M2 contained in the electrode portion E2. The content ratio of the plurality of metal particles M2 contained in the electrode portion E1 is, for example, equal to or more than 80 wt % and equal to or less than 99 wt %. The content ratio of the plurality of metal particles M2 contained in the electrode portion E2 is, for example, equal to or more than 70 wt % and equal to or less than 90 wt %. In this modification, the content ratio of the plurality of metal particles M2 contained in the electrode portion E1 is approximately 95 wt %, and the content ratio of the plurality of metal particles M2 contained in the electrode portion E2 is approximately 90 wt %. For example, when the electrode portion E1 constitutes a first electrode portion, the electrode portion E2 constitutes a second electrode portion.

The content ratio of the metal particles M2 at each of the electrode portions E1 and E2 is obtained, for example, as follows.

A cross-sectional photograph of the multilayer coil component 1A including each of the electrode portions E1 and E2 is acquired. The cross-sectional photograph is obtained from, for example, capturing a cross section of the multilayer coil component 1A when cut along a plane that is parallel to the pair of side surfaces 2e and 2f and is separated by a predetermined distance from the pair of side surfaces 2e and 2f. The plane is, for example, equidistant from the pair of side surfaces 2e and 2f.

Image processing is performed on the acquired cross-sectional photograph using software. From the image processing, a boundary between the element body 2 and the electrode layer E, a boundary between the electrode portion E1 and the electrode portion E2, and a surface of the electrode layer E (electrode portion E2) are determined, and areas of the electrode portions E1 and E2 are obtained. From the image processing, the boundary of each metal particle M2 is determined and the area of each metal particle M2 is obtained. A total area of the metal particles M2 included in the electrode portion E1 and a total area of the metal particles M2 included in the electrode portion E2 are obtained.

An area ratio of the metal particles M2 at the electrode portion E1 is obtained from dividing the total area of the metal particles M2 contained in the electrode portion E1 by the area of the electrode portion E1. The area ratio of the metal particles M2 at the electrode portion E1 is the content ratio of the metal particles M2 at the electrode portion E1.

An area ratio of the metal particles M2 at the electrode portion E2 is obtained from dividing the total area of the metal particles M2 contained in the electrode portion E2 by the area of the electrode portion E2. The area ratio of the metal particles M2 at the electrode portion E2 is the content ratio of the metal particles M2 at the electrode portion E2.

In the multilayer coil component 1A, the electrode layer E includes the electrode portion E1 and the electrode portion E2. The connection end 31a of the coil conductor 31 is connected to the corresponding electrode portion E1. The connection end 36a of the coil conductor 36 is connected to the corresponding electrode portion E1. The content ratio of the metal particles M2 included in the electrode portion E1 is larger than the content ratio of the metal particles M2 included in the electrode portion E2. Therefore, in the multilayer coil component 1A, each of the connection ends 31a and 36a tends to be physically connected to the metal particles M2 included in the electrode portion E1. As a result, the multilayer coil component 1A improves connectivity between each of the coil conductors 31 and 36 and the electrode layer E.

The electrode portion E2 included in the external electrode 4 opposes the coil conductors 32 to 36 in the first direction D1. Therefore, in the multilayer coil component 1A, stray capacitance tends to be generated between the electrode portion E2 included in the external electrode 4 and the coil conductors 32 to 36. However, in the external electrode 4, the content ratio of the metal particles M2 included in the electrode portion E2 is smaller than the content ratio of the metal particles M2 included in the electrode portion E1, and thus the multilayer coil component 1A tends to reduce stray capacitance generated between the electrode portion E2 included in the external electrode 4 and the coil conductors 32 to 35.

The electrode portion E2 included in the external electrode 5 opposes the coil conductors 31 to 35 in the first direction D1. Therefore, in the multilayer coil component 1A, stray capacitance tends to be generated between the electrode portion E2 included in the external electrode 5 and the coil conductors 31 to 35. However, in the external electrode 5, the content ratio of the metal particles M2 included in the electrode portion E2 is smaller than the content ratio of the metal particles M2 included in the electrode portion E1, and thus the multilayer coil component 1A tends to reduce stray capacitance generated between the electrode portion E2 included in the external electrode 5 and the coil conductors 31 to 35.

As a result, the multilayer coil component 1A restrains an increase in stray capacitance between the electrode layer E and the coil 3.

Figure 10:
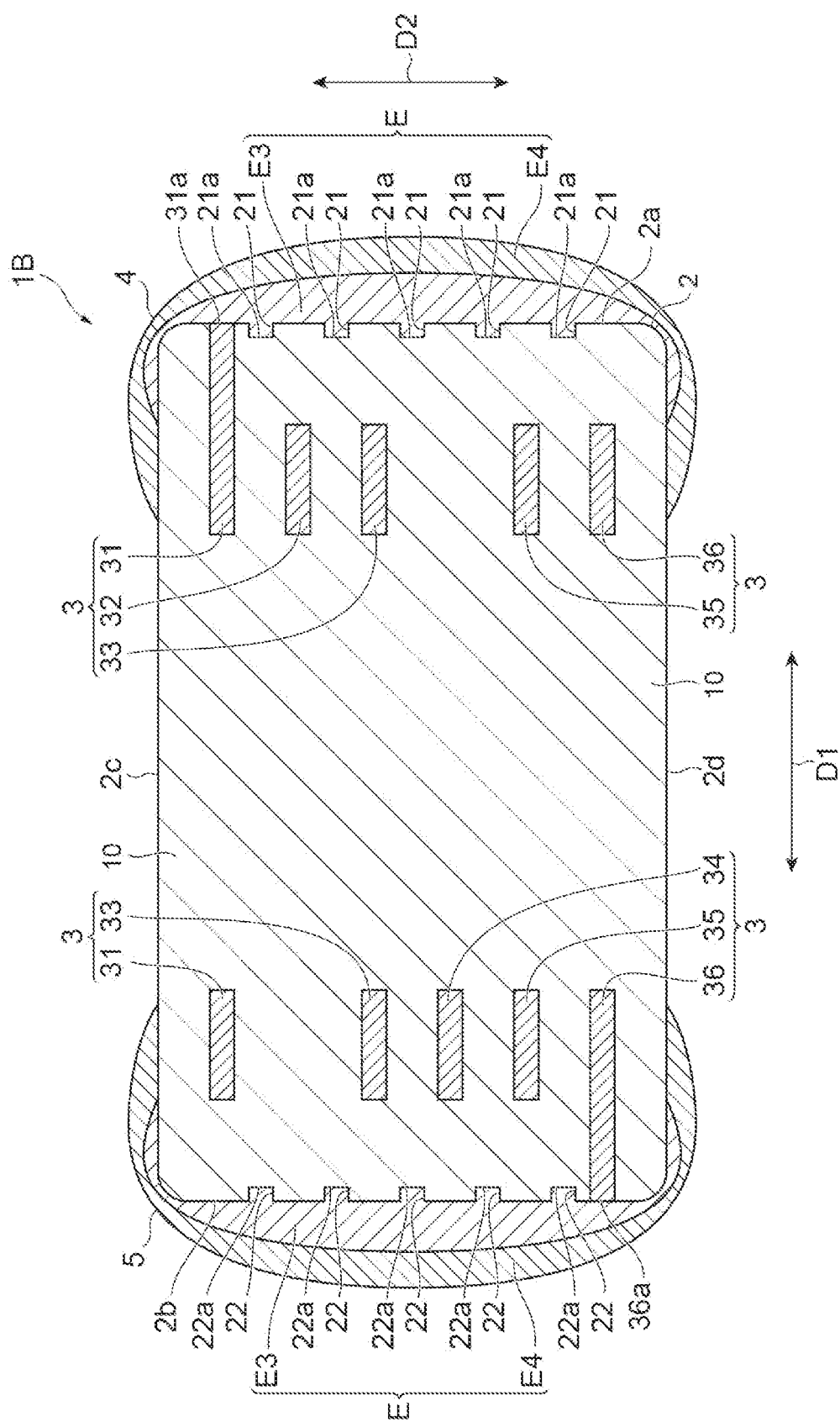
FIG. 10 is a diagram illustrating a cross-sectional configuration of a multilayer coil component according to a second modification of the present embodiment.

Next, a configuration of a multilayer coil component 1B according to a second modification of the present embodiment will be described with reference to FIG. 10. FIG. 10 is a diagram illustrating a cross-sectional configuration of the multilayer coil component according to the second modification. The multilayer coil component 1B is generally similar or identical to the multilayer coil component 1 described above. However, the multilayer coil component 1B differs from the multilayer coil component 1 in the configuration of the external electrodes 4 and 5. The difference between the multilayer coil component 1B and the multilayer coil component 1 will be mainly described below.

Each of the external electrodes 4 and 5 includes a plurality of electrode portions E3 and E4. In this modification, each of the external electrodes 4 and 5 includes two electrode portions E3 and E4. The electrode portion E3 is in contact with the element body 2. The electrode portion E4 covers the electrode portion E3. In this modification, the electrode portion E4 is in contact with the element body 2 and the electrode portion E3.

First, a configuration of the external electrode 4 included in the multilayer coil component 1B will be described.

The electrode portion E3 is disposed on the end surface 2a. The entire end surface 2a is covered with the electrode portion E3. The electrode portion E3 is in contact with the entire end surface 2a. The electrode portion E3 is in contact with a plurality of the surface portions 21a.

The electrode portion E3 is also disposed on a part of each of the four side surfaces 2c, 2d, 2e, and 2f. A part that is included in the side surface 2c and where the electrode portion E3 is disposed is positioned near the end surface 2a. A part that is included in the side surface 2d and where the electrode portion E3 is disposed is positioned near the end surface 2a. A part that is included in the side surface 2e and where the electrode portion E3 is disposed is positioned near the end surface 2a. A part that is included in the side surface 2f and where the electrode portion E3 is disposed is positioned near the end surface 2a. In this modification, the electrode portion E3 is disposed on the entire end surface 2a and a part of each of the four side surfaces 2c, 2d, 2e, and 2f near the end surface 2a. The electrode portion E3 may be disposed only on the end surface 2a.

The electrode portion E4 is disposed on the electrode portion E3. The electrode portion E3 is covered with the electrode portion E4. In this modification, the entire electrode portion E3 is covered with the electrode portion E4. The electrode portion E4 is in direct contact with the electrode portion E3.

The electrode portion E4 is also disposed on a part of each of the four side surfaces 2c, 2d, 2e, and 2f. A part that is included in the side surface 2c and where the electrode portion E4 is disposed is exposed from the electrode portion E3 and positioned near the end surface 2a. A part that is included in the side surface 2d and where the electrode portion E4 is disposed is exposed from the electrode portion E3 and positioned near the end surface 2a. A part that is included in the side surface 2e and where the electrode portion E4 is disposed is exposed from the electrode portion E3 and positioned near the end surface 2a. A part that is included in the side surface 2f and where the electrode portion E4 is disposed is exposed from the electrode portion E3 and positioned near the end surface 2a. In this modification, the electrode portion E4 is disposed on the entire electrode portion E3 and a part of each of the four side surfaces 2c, 2d, 2e, and 2f exposed from the electrode portion E3 and positioned near the end surface 2a.

Next, the configuration of the external electrode 5 included in the multilayer coil component 1B will be described.

The electrode portion E3 is disposed on the end surface 2b. The entire end surface 2b is covered with the electrode portion E3. The electrode portion E3 is in contact with the entire end surface 2b. The electrode portion E3 is in contact with a plurality of the surface portions 22a.

The electrode portion E3 is also disposed on a part of each of the four side surfaces 2c, 2d, 2e, and 2f. A part that is included in the side surface 2c and where the electrode portion E3 is disposed is positioned near the end surface 2b. A part that is included in the side surface 2d and where the electrode portion E3 is disposed is positioned near the end surface 2b. A part that is included in the side surface 2e and where the electrode portion E3 is disposed is positioned near the end surface 2b. A part that is included in the side surface 2f and where the electrode portion E3 is disposed is positioned near the end surface 2b. In this modification, the electrode portion E3 is disposed on the entire end surface 2b and a part of each of the four side surfaces 2c, 2d, 2e, and 2f near the end surface 2b. The electrode portion E3 may be disposed only on the end surface 2b.

The electrode portion E4 is disposed on the electrode portion E3. The electrode portion E3 is covered with the electrode portion E4. In this modification, the entire electrode portion E3 is covered with the electrode portion E4. The electrode portion E4 is in direct contact with the electrode portion E3.

The electrode portion E4 is also disposed on a part of each of the four side surfaces 2c, 2d, 2e, and 2f. A part that is included in the side surface 2c and where the electrode portion E4 is disposed is exposed from the electrode portion E3 and positioned near the end surface 2b. A part that is included in the side surface 2d and where the electrode portion E4 is disposed is exposed from the electrode portion E3 and positioned near the end surface 2b. A part that is included in the side surface 2e and where the electrode portion E4 is disposed is exposed from the electrode portion E3 and positioned near the end surface 2b. A part that is included in the side surface 2f and where the electrode portion E4 is disposed is exposed from the electrode portion E3 and positioned near the end surface 2b. In this modification, the electrode portion E4 is disposed on the entire electrode portion E3 and a part of each of the four side surfaces 2c, 2d, 2e, and 2f exposed from the electrode portion E3 and positioned near the end surface 2b.

As described above, each electrode layer E includes the electrode portion E3 and the electrode portion E4.

A content ratio of the metal particles M2 included in the electrode portion E3 is smaller than a content ratio of the metal particles M2 included in the electrode portion E4. The content ratio of the metal particles M2 contained in the electrode portion E3 is, for example, equal to or more than 70 wt % and equal to or less than 90 wt %. The content ratio of the metal particles M2 contained in the electrode portion E4 is, for example, equal to or more than 75 wt % and equal to or less than 95 wt %. In this modification, the content ratio of the metal particles M2 included in the electrode portion E3 is approximately 85 wt %, and the content ratio of the metal particles M2 included in the electrode portion E4 is approximately 90 wt %. For example, when the electrode portion E3 constitutes a first electrode portion, the electrode portion E4 constitutes a second electrode portion.

The content ratio of the metal particles M2 at each of the electrode portions E3 and E4 is obtained, for example, as follows.

A cross-sectional photograph of the multilayer coil component 1B including each of the electrode portions E3 and E4 is acquired. The cross-sectional photograph is obtained from, for example, capturing a cross section of the multilayer coil component 1B when cut along a plane that is parallel to the pair of side surfaces 2e and 2f and is separated by a predetermined distance from the pair of side surfaces 2e and 2f. The plane is, for example, equidistant from the pair of side surfaces 2e and 2f. The cross-sectional photograph may be obtained from capturing a cross section of the multilayer coil component 1B when cut along a plane parallel to the pair of side surfaces 2c and 2d and separated by a predetermined distance from the pair of side surfaces 2c and 2d.

Image processing is performed on the acquired cross-sectional photograph using software. From the image processing, a boundary between the element body 2 and the electrode layer E, a boundary between the electrode portion E3 and the electrode portion E4, and a surface of the electrode layer E (electrode portion E4) are determined, and areas of the electrode portions E3 and E4 are obtained. From the image processing, the boundary of each metal particle M2 is determined and the area of each metal particle M2 is obtained. A total area of the metal particles M2 included in the electrode portion E3 and a total area of the metal particles M2 included in the electrode portion E4 are obtained.

An area ratio of the metal particles M2 at the electrode portion E3 is obtained from dividing the total area of the metal particles M2 contained in the electrode portion E3 by the area of the electrode portion E3. The area ratio of the metal particles M2 at the electrode portion E3 is the content ratio of the metal particles M2 at the electrode portion E3.

An area ratio of the metal particles M2 at the electrode portion E4 is obtained from dividing the total area of the metal particles M2 contained in the electrode portion E4 by the area of the electrode portion E4. The area ratio of the metal particles M2 at the electrode portion E4 is the content ratio of the metal particles M2 at the electrode portion E4.

In the multilayer coil component 1B, the electrode layer E includes the electrode portion E3 and the electrode portion E4. The content ratio of the metal particles M2 contained in the electrode portion E3 is smaller than the content ratio of the metal particles M2 contained in the electrode portion E4.

Therefore, the multilayer coil component 1B tends to reduce stray capacitance between the electrode portion E3 included in the external electrode 4 and the coil conductors 32 to 36 and stray capacitance between the electrode portion E3 included in the external electrode 5 and the coil conductors 31 to 35. As a result, the multilayer coil component 1B restrains an increase in the stray capacitance between the electrode layer E and the coil 3.

Although the embodiment and modifications of the present disclosure have been described above, the present disclosure is not necessarily limited to the embodiment and modifications, and the embodiment can be variously changed without departing from the scope of the disclosure.

In the multilayer coil components 1, 1A, and 1B, the average particle diameter of the plurality of metal particles M2 may not be larger than 50% of the average particle diameter of the plurality of metal magnetic particles M1. The configuration in which the average particle diameter of the plurality of metal particles M2 is larger than 50% of the average particle diameter of the plurality of metal magnetic particles M1 further restrains a decrease in the self-resonant frequency as described above.

In the multilayer coil components 1, 1A, and 1B, each of the end surfaces 2a and 2b may not be formed with the recess 21. The configuration in which each of the end surfaces 2a and 2b is formed with the recess 21 improves the fixing strength between the pair of external electrodes 4 and 5 and the element body 2 as described above.

In the multilayer coil components 1, 1A, and 1B, each of the recesses 21 and 22 may be formed at a position overlapping the plurality of coil conductors 31 to 36 when viewed in the first direction D1. The configuration in which the recesses 21 and 22 are formed at positions not overlapping the plurality of coil conductors 31 to 36 when viewed in the first direction D1 and at positions different from the plurality of coil conductors 31 to 36 in the second direction D2 improves the fixing strength between the external electrodes 4 and 5 and the element body 2 and restrains a decrease in the self-resonant frequency as described above.

What is claimed is:

1. A multilayer coil component comprising:
an element body including a plurality of metal magnetic particles and including a pair of end surfaces opposing each other;
a coil disposed in the element body; and
a pair of external electrodes respectively disposed on both end portions of the element body in a direction in which the pair of end surfaces oppose each other and connected to the coil, wherein
each of the pair of external electrodes includes a conductive resin layer including resin and a plurality of metal particles and in contact with a corresponding end surface of the pair of end surfaces, and
the conductive resin layer includes a metal particle group consisting of a plurality of first metal particles included in the plurality of metal particles, the plurality of first metal particles adjacent to the corresponding end surface and separated from the corresponding end surface.

2. The multilayer coil component according to claim 1, wherein
the conductive resin layer includes another metal particle group consisting of a plurality of second metal particles included in the plurality of metal particles, the plurality of second metal particles adjacent to the corresponding end surface and in contact with the corresponding end surface, and
a position of an end of each of the plurality of first metal particles closest to the end surface and a position of an end of each of the plurality of second metal particles closest to the end surface are different in the direction in which the pair of end surfaces oppose each other.

3. The multilayer coil component according to claim 1, wherein the plurality of metal particles have an average particle diameter larger than 50% of an average particle diameter of the plurality of metal magnetic particles.

4. The multilayer coil component according to claim 1, wherein
the coil includes a plurality of coil conductors electrically connected to each other,
the plurality of coil conductors include a pair of coil conductors each including a connection end exposed on the corresponding end surface,
each of the pair of end surfaces includes:
a first region where the connection end is exposed; and
a second region opposing a coil conductor, among the plurality of coil conductors, excluding the coil conductor including the connection end exposed in the first region in the direction in which the pair of end surfaces oppose each other,
the conductive resin layer includes a first electrode portion in contact with the first region and a second electrode portion in contact with the second region, and
the first electrode portion has a content ratio of the metal particle larger than a content ratio of the metal particle in the second electrode portion.

5. The multilayer coil component according to claim 4, wherein the content ratio of the plurality of metal particles in the first electrode portion is equal to or more than 80 wt % and equal to or less than 99 wt %, and
the content ratio of the plurality of metal particles in the second electrode portion is equal to or more than 70 wt % and equal to or less than 90 wt %.

6. The multilayer coil component according to claim 1, wherein
the conductive resin layer includes:
a first electrode portion in contact with the corresponding end surface and including the metal particle group; and
a second electrode portion disposed on the first electrode portion, and the first electrode portion has a content ratio of the metal particle smaller than a content ratio of the metal particle in the second electrode portion.

7. The multilayer coil component according to claim 6, wherein the content ratio of the plurality of metal particles in the first electrode portion is equal to or more than 70 wt % and equal to or less than 90 wt %, and the content ratio of the plurality of metal particles in the second electrode portion is equal to or more than 75 wt % and equal to or less than 95 wt %.

8. The multilayer coil component according to claim 1, wherein each of the pair of end surfaces is formed with a recess, and the conductive resin layer is in contact with a surface portion defining the recess, the surface portion included in the corresponding end surface.

9. The multilayer coil component according to claim 1, wherein the coil includes a plurality of coil conductors electrically connected to each other, each of the pair of end surfaces is formed with a recess, the conductive resin layer is in contact with a surface portion defining the recess, the surface portion included in the corresponding end surface, and each of the recesses is formed at a position not overlapping the plurality of coil conductors when viewed in the direction in which the pair of end surfaces oppose each other and a position different from the plurality of coil conductors in a direction intersecting the direction in which the pair of end surfaces oppose each other.

10. The multilayer coil component according to claim 1, wherein a ratio of an average particle diameter of the plurality of metal particles to an average particle diameter of the plurality of metal magnetic particles is larger than 0.5.

11. The multilayer coil component according to claim 10, wherein the average particle diameter of the plurality of metal magnetic particles is equal to or more than 1.0 μm and equal to or less than 50 μm, and the average particle diameter of the plurality of metal particles is equal to or more than 0.5 μm and equal to or less than 25 μm.

* * * * *